United States Patent [19]

Noble et al.

[11] Patent Number: 5,712,655

[45] Date of Patent: Jan. 27, 1998

[54] MOVING MESSAGE DISPLAY METHOD AND APPARATUS

[75] Inventors: Paul Noble, New York, N.Y.; Richard Geyer, Keyport, N.J.

[73] Assignee: Imtech International, Inc., Denville, N.J.

[21] Appl. No.: 142,581

[22] Filed: Oct. 25, 1993

(Under 37 CFR 1.47)

Related U.S. Application Data

[63] Continuation of Ser. No. 18,337, Feb. 16, 1993, abandoned, which is a continuation of Ser. No. 436,421, Nov. 14, 1989, abandoned.

[51] Int. Cl.$^6$ ........................................................ G09G 5/34
[52] U.S. Cl. ................................ 345/123; 345/1; 345/130
[58] Field of Search ........................................ 345/121, 123, 345/127, 129, 130, 1

[56] References Cited

U.S. PATENT DOCUMENTS

| | | | |
|---|---|---|---|
| 4,194,833 | 3/1980 | Lester et al. | 355/202 |
| 4,746,981 | 5/1988 | Nadan et al. | 345/127 |
| 4,922,448 | 5/1990 | Kunieda et al. | 395/750 |
| 4,943,866 | 7/1990 | Barker et al. | 345/153 |
| 4,970,502 | 11/1990 | Kunikane et al. | 345/56 |

*Primary Examiner*—Mark R. Powell
*Assistant Examiner*—Matthew Luu
*Attorney, Agent, or Firm*—Darby & Darby

[57] ABSTRACT

A display of a series line organized images is provided in which the images are spread across a plurality of linearly arranged display devices and appear to be shifting from one display device to the next. The line organized images are first formed into a two dimensional display in which the images scroll along lines directed along one dimension and are wrapped from one line to the next along the other dimension. For example, the images may represent alphanumeric characters which scroll from one end of a row to the other end and, when scrolling off one row, are wrapped to the next row. This image is then expanded so that an image line fills a display device along the other dimension. This expanded image is then applied to the display devices so that each display device receives the expanded image with a predetermined shift along the one dimension relative an immediately adjacent display device.

13 Claims, 3 Drawing Sheets

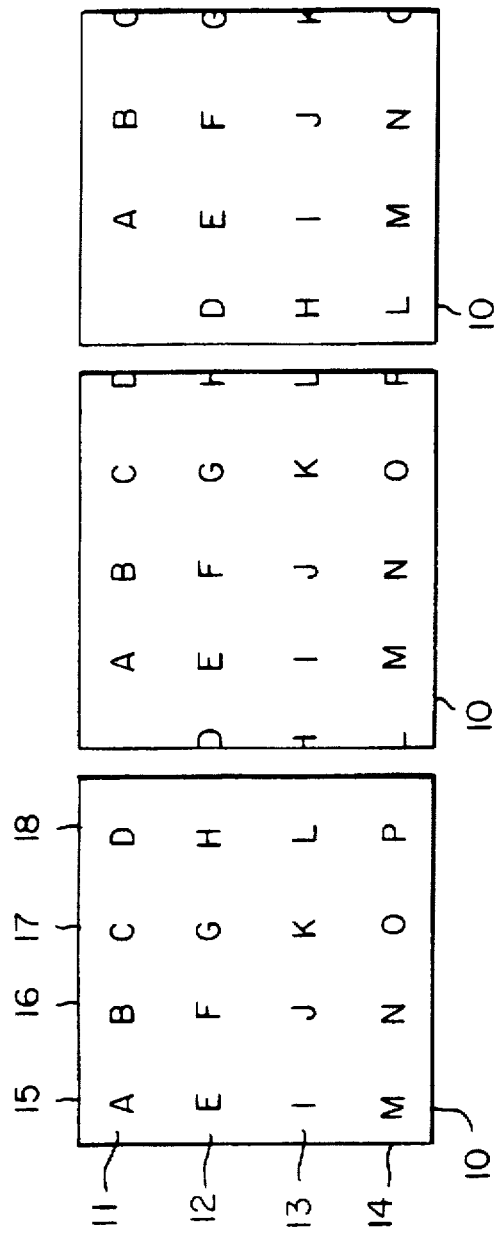

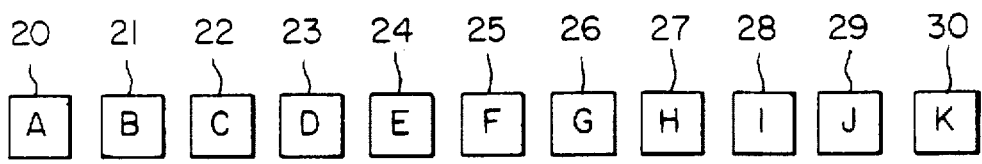
FIG. 4
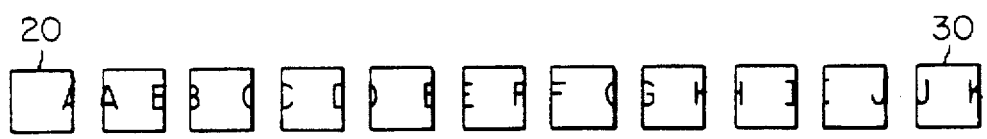
FIG. 5
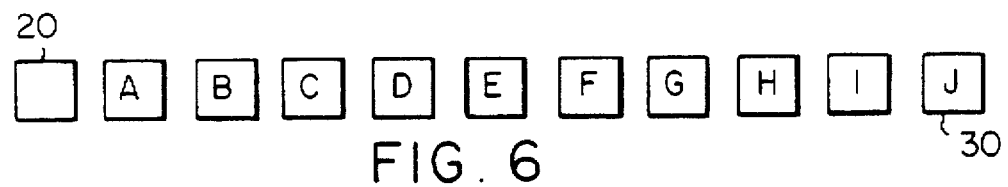
FIG. 6
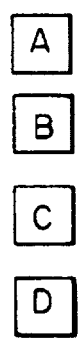 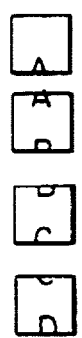 
FIG. 8   FIG. 9   FIG. 10

MOVING MESSAGE DISPLAY METHOD AND APPARATUS

This patent application is a continuation of application Ser. No. 8/018,337 filed Feb. 16, 1993, now abandoned, which was a continuation of application Ser. No. 07/436,421 filed Nov. 14, 1989, now abandoned.

FIELD OF THE INVENTION

The present invention relates to a display system and method, and is, more particularly, directed to the provision of a moving display system incorporating a plurality of scanning display devices, and a method for producing such a display.

BACKGROUND OF THE INVENTION

In the past moving displays have been produced by a number of different techniques. For example, matrices of lamps or LED's, or unitary LCD modules, have been employed to produce such a display. Lamp and LED matrices have limited resolution, are not adaptable to multi-color display, and are difficult to program. LCD module displays are generally relatively small, do not permit color displays, and are not very bright.

The present invention is therefore directed to the provision of a moving display apparatus and method that provide high resolution of the display, permit the use of full color, and require a minimum of control apparatus.

In accordance with the present invention, a display of a series line organized images is provided in which the images are spread across a plurality of linearly arranged display devices and appear to be shifting from one display device to the next. The line organized images are first formed into a two dimensional display in which the images scroll along lines directed along one dimension and are wrapped from one line to the next along the other dimension. For example, the images may represent alphanumeric characters which scroll from one end of a row to the other end and, when scrolling off one row, are wrapped to the next row. This image is then expanded so that an image line fills a display device along the other dimension. This expanded image is then applied to the display devices so that each display device receives the expanded image with a predetermined shift along the one dimension relative an immediately adjacent display device.

BRIEF DESCRIPTION OF THE DRAWING

In order that the invention may be more clearly understood, it will now be disclosed in greater detail with reference to the accompanying drawing, wherein:

FIGS. 1–3 depict sequentially the movement of images on a single television screen, for illustrating a type of signal that may be employed in accordance with the invention;

FIGS. 4–6 depict sequentially the movement of images in a linear display, in accordance with the invention;

FIGS. 8–10 depict sequentially the vertical movement of images in a vertical display, in accordance with a further embodiment of the invention.

DETAILED DISCLOSURE OF THE INVENTION

Figure 7:
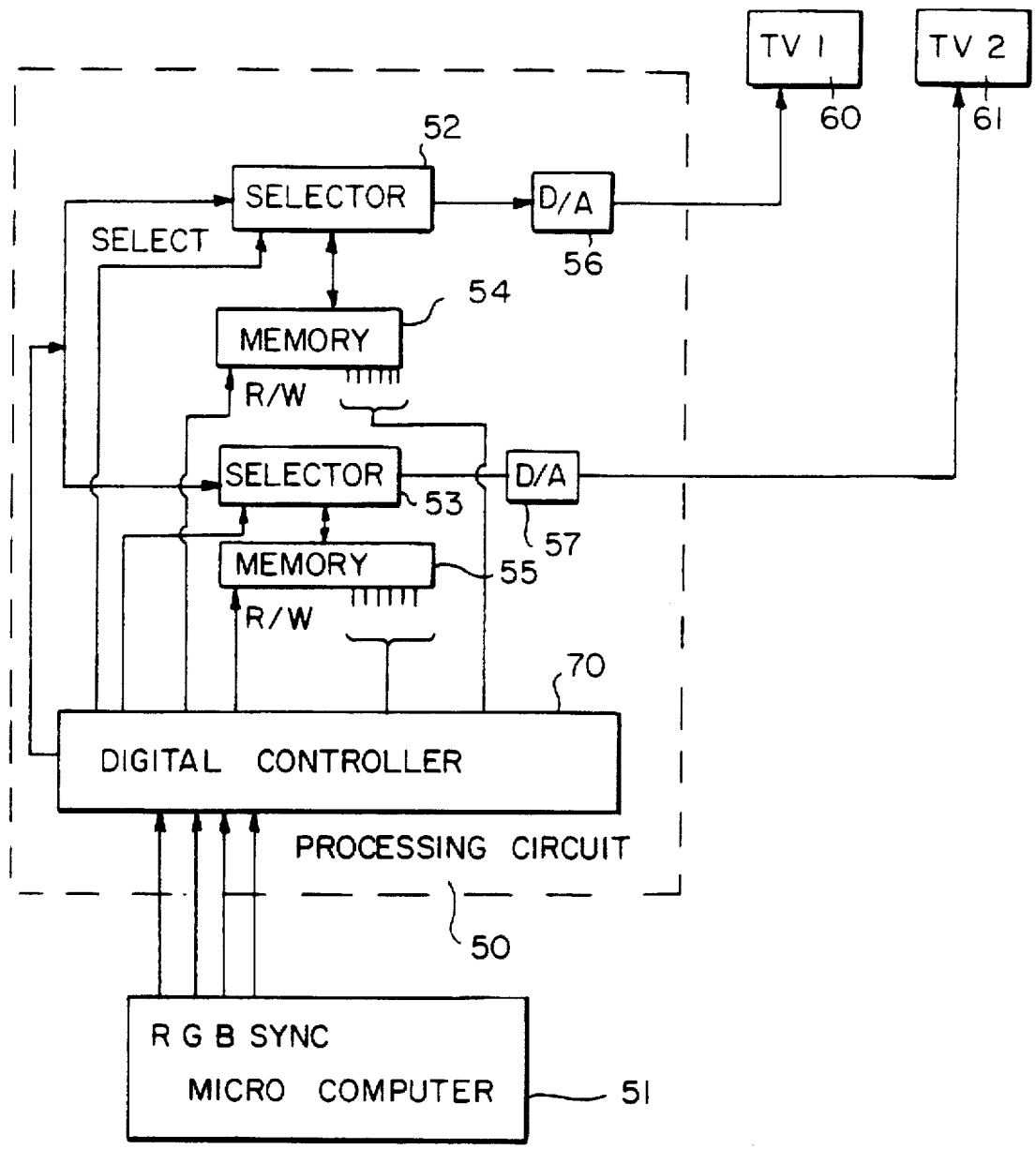
FIG. 7 illustrates a block diagram of a system in accordance with the invention.

Referring now to the drawings, and more particularly to FIG. 1, there is illustrated a television screen 10 displaying an image having a plurality of rows 11–14 and a plurality of columns 15–18, to define a matrix of a plurality of cells. The overall image is comprised of a plurality of separate images, one in each of the cells. In the figure, the image of each cell is a separate letter A–P, for the sake of illustration only, it being apparent that the cells may display any desired image.

FIG. 2 illustrates a display similar to that of FIG. 1, but wherein the image of each cell has been displaced so that it appears partly at the right hand side of the respective cell, and partly at the left hand side of the next cell. The image from the cell at the end of each row has been partially displaced to the first cell of the next row. Similarly, FIG. 3 illustrates a similar display, but in which the image of each cell of FIG. 1 has been fully displaced into the next cell, or in the case of the end cell in each row, into the first cell of the next row.

FIGS. 1–3 have been presented in order to more clearly define the signals that are, employed in the present invention for the production of a moving display. Such signals, which may be generated by conventional signal generating software and devices, correspond to a display in which a plurality of separate images, organized in lines, move sequentially or "scroll" across the screen in separate rows and are displaced or "wrapped" from the end of each row to the start of the next row. It will of course be apparent that the signals may alternatively correspond to moving columns of images.

In accordance with the invention, it is preferred that the signals be non-interlaced.

In accordance with the invention, the signals corresponding to the separate cells of FIGS. 1–3 are applied to an array of display devices such as television monitors 20–30, as illustrated in FIGS. 4–6. As can be seen in these figures, the images preferably fill the displays in the direction perpendicular to the scrolling direction. In these figures the monitors have been arranged adjacent one another in the horizontal direction. Also, there is illustrated a lesser number of monitors than the number of cells of the display of FIG. 1, solely in order to simplify the drawings. FIGS. 4–6 thus illustrate the display at several sequential points in time, to show that the overall display is a moving display. It is of course apparent that the images do not move in the large steps represented by FIGS. 4–6, but move smoothly across the display.

As will be observed, in FIG. 4, the image of FIG. 1 has been expanded vertically so as to fill display devices 20–30 with a line of the image of FIG. 1. Also, this expanded image is applied to the display devices 20–30 with a horizontal shift from one display device to the next, to produce the effect of having the image of FIG. 1 linearly spread across the display devices. It will be appreciated that, since the image of FIG. 1 has line or row wrapping, the composite elongated image exhibited or display devices 20–30 may include more than a line of the image of FIG. 1.

An apparatus that may be employed to convert the scrolling and wrapping signal from a conventional source for application to the individual monitors is disclosed in U.S. Pat. No. 4,746,981, of J. Nadan, E. Bahr and P. Noble, assigned to the assignee of the present application. The apparatus disclosed in this patent is directed to the separation of signals corresponding to a single image into signals corresponding to a plurality of separate parts of such image for display on a plurality of different monitors, to produce an enlarged display. However, it will be appreciated that such apparatus may be employed, with software modifications only, for the production of the signals for the individual linearly oriented monitors in accordance with the invention.

FIG. 7 illustrates the block diagram of a system in accordance with the invention. In this diagram, block 50 represents, in simplified form, the processing circuit disclosed in the above patent. In this system, the image signals from a conventional external microcomputer 51 are applied to a plurality of selectors 52, 53 via the digital controller 70. Each selector 52, 53 is coupled to a separate memory 54, 55, and provides signals to a separate digital-to-analog (D/A) converter 56, 57. The outputs of the D/A converters 56, 57 are applied to separate, adjacently arranged television monitors 60, 61. It is of course understood that, for simplification, this figure illustrates the control for only two adjacent monitors, and that a separate selector, memory and converter, or the equivalent thereof, is also employed for each further monitor of the complete display. The digital controller 70 of the processing circuit 50 is connected to control the read/write functions of the memories, to select the different selectors 52, 53, and to address the memory locations of each of the memories. The output of the microcomputer 51 provides horizontal and vertical synchronization signals to digital controller 70.

In accordance with the invention, the program of the controller 70 automatically controls each selector to direct signals corresponding to a separate cell of the overall moving image to the respective memory, and to direct the signals from that memory to a separate monitor. The controller further controls the memories to write signals input via the respective selector during the time that the respective cell is being imaged, and to output such signals to the respective monitor at other times. This technique may comprise writing into separate memories in adjacent fields, while reading the memories during the times at which they are not storing signals.

Digitizing, splitting, expanding and distributing of the single video signal from the microcomputer 51 into multiple monitor outputs is controlled entirely within the processing circuit 50. All timing pulses needed for addressing and read/write operations for the memories 54, 55 are generated from a composite sync signal extracted from the external microcomputer video source 51.

The external microcomputer is connected to the processing circuit only as a video source, and it has no direct control over the internal operation of the processing circuit. The microcomputer is programmed in the normal manner using a single output monitor. The programming must take into consideration vertical and horizontal expansion if the image is to be expanded by the processing circuit for display on the monitors 60, 61. By using appropriate conversion formulas, a programmer can place graphic images on any portion of the output monitor matrix by displaying them at an appropriate corresponding location on the microcomputer monitor.

As opposed to the program employed in the above patent, it is apparent that, in accordance with the invention, it is not necessary to blank any of the image lines. In accordance with the teachings of the patent, however, lines of the original signal are replicated, in order to enable the display of each cell of the display on a separate monitor.

It is further apparent, in accordance with the invention, that the display may alternatively represent vertically moving images, as illustrated sequentially in FIGS. 8–10.

The present invention thus provides a moving display having a much greater resolution than conventional LED displays, and permits the use of full color. It is capable of readily displaying infinitely variable text fonts, and also has full computer graphic capability. The display has increased fluidity, as compared with known displays. In addition, minimal apparatus is required for controlling the display.

In one embodiment of the invention, the processing circuit 50 had a resolution limited to 360×240 pixels. This resolution is close to the pixel output of a microcomputer such as the Amiga microcomputer, so that very little picture information is lost due to the conversion and expansion by the processing circuit. In addition, there is no visible gap between pixels on a video display, as opposed to LED matrix displays which have noticeable gaps.

While the invention has been disclosed and described with reference to a single embodiment, it will be apparent that variations and modification may be made therein, and it is therefore intended in the following claims to cover each such variation and modification as falls within the true spirit and scope of the invention.

What is claimed:

1. A system for providing a display of linearly moving images comprising:

means for providing a video signal representing a two-dimensional display of said images in which the images scroll line-wise along one dimension and are line-wrapped along the other dimension;

a plurality of display devices in a substantially linear arrangement;

means for processing said video signal to produce a modified video signal corresponding to a video image which has been expanded so that one line wise scrolling line will substantially fill a display device along said other-dimension; and means for providing said modified video signal to each of the linearly arranged display devices with each display device being provided the modified video signal with a predetermined shift along said one dimension relative to an immediately adjacent display device.

2. The system of claim 1, wherein said one dimension is the horizontal dimension and the video signal represents a display in which line organized images scroll horizontally and are wrapped vertically from the end of one horizontal line to the beginning of the next.

3. The system of claim 1, wherein said means for providing comprises means for storing a plurality of separate portions of said modified video signal and means for applying said stored portions to said display devices so as to achieve said shift.

4. The system of claim 3, wherein said means for storing comprise a microcomputer, a plurality of memories, a plurality of selecting devices connected to be controlled by said microcomputer for directing predetermined portions of the signals from said source to the respective memory and for directing signals from the memories to separate display devices.

5. The system of claim 4, wherein said display devices are laterally adjacent.

6. The system of claim 4, wherein said display devices are vertically adjacent.

7. The system of claim 1, wherein said display devices are laterally adjacent.

8. The system of claim 1, wherein said display devices are vertically adjacent.

9. A method for producing a display of a series line organized images in which the images are spread across a plurality of linearly arranged display devices and appear to be shifting from one display device to the next, comprising the steps of:

forming the line organized images into a two dimensional display in which the images scroll line wise along lines directed along one dimension and are wrapped from one line to the next along the other dimension;

expanding this two dimensional display so that an image line substantially fills a display device along the other dimension; and applying the expanded image to the display devices so that each display device receives the expanded image with a predetermined shift along said one dimension relative to an immediately adjacent display device.

10. The method of claim 9 wherein said images represent alphanumeric characters which scroll from one end of a row to the other end and, when scrolling off one row, are wrapped to opposite end of the next row.

11. The method of claim 9, wherein said applying step comprises storing a plurality of separate portions of said modified video signal and providing said stored portions to said display devices so as to achieve said shift.

12. The method of claim 9 wherein said expanded image is applied to a plurality of laterally adjacent display devices.

13. The method of claim 9 wherein said expanded image is applied to a plurality of vertically adjacent display devices.

* * * * *